(12) United States Patent
Wang

(10) Patent No.: US 11,245,530 B2
(45) Date of Patent: Feb. 8, 2022

(54) SYSTEM AND METHOD FOR SECURE COMMUNICATION

(71) Applicant: Alibaba Group Holding Limited, Grand Cayman (KY)

(72) Inventor: Kang Wang, Beijing (CN)

(73) Assignee: Alibaba Group Holding Limited, George Town (KY)

( * ) Notice: Subject to any disclaimer, the term of this patent is extended or adjusted under 35 U.S.C. 154(b) by 204 days.

(21) Appl. No.: 16/282,079

(22) Filed: Feb. 21, 2019

(65) Prior Publication Data

US 2019/0268157 A1 Aug. 29, 2019

(30) Foreign Application Priority Data

Jan. 3, 2018 (CN) .......................... 201810005954.X

(51) Int. Cl.
*H04L 9/32* (2006.01)
*H04L 29/06* (2006.01)
(Continued)

(52) U.S. Cl.
CPC .......... *H04L 9/3231* (2013.01); *H04L 9/0841* (2013.01); *H04L 9/0844* (2013.01);
(Continued)

(58) Field of Classification Search
CPC ... H04L 9/3231; H04L 9/0844; H04L 9/0891; H04L 9/3215; H04L 63/123; H04L 63/20;
(Continued)

(56) References Cited

U.S. PATENT DOCUMENTS 7,093,129 B1 * 8/2006 Gavagni ............. H04L 63/0428
379/67.1
8,041,335 B2 10/2011 Khetawat
(Continued)

FOREIGN PATENT DOCUMENTS

CN 101222488 7/2008
CN 101741852 6/2010
(Continued)

OTHER PUBLICATIONS

Baker et al. "Recommendation for Key Management—Part 1: General (Revision 3)", NIST Special Publication 800-57, Jul. 2012 (Year:2012).
(Continued)

*Primary Examiner* — J. Brant Murphy
(74) *Attorney, Agent, or Firm* — Shun Yao; Park, Vaughan, Fleming & Dowler LLP

(57) ABSTRACT

One embodiment described herein provides a system and method for secure point-to-point communication. During operation, the system establishes a voice communication channel between a local client device and a remote client device and obtains an encryption key negotiated between the local client device and the remote client device. The system can then obtain a voice signal generated by a user associated with the local client device based on the encryption key and performs a key-validation operation by sending the voice signal from the local client device to the remote client device using the voice communication channel. In response to a successful validation of the encryption key, the system establishes a secure point-to-point communication channel between the local and remote client devices using the validated encryption key.

20 Claims, 14 Drawing Sheets

(51) Int. Cl.
*H04L 9/14* (2006.01)
*H04L 9/08* (2006.01)

(52) U.S. Cl.
CPC .............. *H04L 9/0891* (2013.01); *H04L 9/14* (2013.01); *H04L 9/3215* (2013.01); *H04L 63/123* (2013.01); *H04L 63/20* (2013.01)

(58) Field of Classification Search
CPC ..... H04L 9/14; H04L 9/0841; H04L 63/0861; H04L 63/061; H04L 9/0819; G10L 15/26
See application file for complete search history.

(56) References Cited

U.S. PATENT DOCUMENTS

| | | |
|---|---|---|
| 8,266,433 B1 | 9/2012 | Przykucki |
| 8,990,550 B1 | 3/2015 | Hushon |
| 9,698,979 B2 | 7/2017 | Armstrong |
| 9,830,467 B1 | 11/2017 | Harold |
| 2001/0023416 A1 | 9/2001 | Hosokawa |
| 2003/0229789 A1* | 12/2003 | Morais .............. H04L 9/083 713/171 |
| 2005/0071632 A1 | 3/2005 | Pauker |
| 2005/0232424 A1* | 10/2005 | Dobranski ........... H04K 1/02 380/270 |
| 2006/0101266 A1* | 5/2006 | Klassen ............. H04L 9/08 713/170 |
| 2008/0065881 A1 | 3/2008 | Dawson |
| 2009/0019285 A1 | 1/2009 | Chen |
| 2009/0125444 A1 | 5/2009 | Cochran |
| 2009/0193184 A1 | 7/2009 | Yu |
| 2009/0262942 A1 | 10/2009 | Maeda |
| 2010/0132015 A1 | 5/2010 | Lee |
| 2010/0135490 A1* | 6/2010 | Kwon ............. H04N 21/44213 380/236 |
| 2010/0277435 A1 | 11/2010 | Han |
| 2010/0281254 A1* | 11/2010 | Carro .............. H04L 51/04 713/162 |
| 2010/0299526 A1 | 11/2010 | Wiseman |
| 2011/0167503 A1 | 7/2011 | Horal |
| 2011/0302408 A1* | 12/2011 | McDermott ........ H04L 65/1053 713/153 |
| 2012/0084570 A1 | 4/2012 | Kuzin |
| 2012/0087500 A1 | 4/2012 | Ukita |
| 2012/0269346 A1* | 10/2012 | Best .............. H04L 63/20 380/270 |
| 2013/0159704 A1 | 6/2013 | Chandrasekaran |
| 2013/0219454 A1 | 8/2013 | Hewinson |
| 2013/0259233 A1 | 10/2013 | Baba |
| 2013/0262873 A1 | 10/2013 | Read |
| 2013/0267204 A1 | 10/2013 | Schultz |
| 2013/0308506 A1 | 11/2013 | Kim |
| 2013/0311707 A1 | 11/2013 | Kawamura |
| 2014/0104137 A1 | 4/2014 | Brown |
| 2014/0173713 A1 | 6/2014 | Zheng |
| 2015/0062904 A1 | 3/2015 | Sanga |
| 2015/0089624 A1 | 3/2015 | Kim |
| 2015/0134727 A1 | 5/2015 | Lee |
| 2015/0134947 A1 | 5/2015 | Varcoe |
| 2015/0207926 A1 | 7/2015 | Brown |
| 2015/0270963 A1 | 9/2015 | Tanizawa |
| 2015/0271147 A1 | 9/2015 | Tanizawa |
| 2015/0309924 A1 | 10/2015 | Chen |
| 2016/0013937 A1 | 1/2016 | Choi |
| 2016/0044030 A1* | 2/2016 | Galwas ............... H04L 63/0869 380/262 |
| 2016/0087946 A1 | 3/2016 | Yang |
| 2016/0127127 A1 | 5/2016 | Zhao |
| 2016/0149700 A1 | 5/2016 | Fu |
| 2016/0357452 A1 | 12/2016 | Kadam |
| 2016/0366713 A1 | 12/2016 | Sonnino |
| 2017/0104588 A1 | 4/2017 | Camenisch |
| 2018/0063709 A1 | 3/2018 | Morrison |
| 2018/0077449 A1 | 3/2018 | Herz |
| 2018/0262907 A1 | 9/2018 | Alanis |
| 2018/0351734 A1 | 12/2018 | Zhao |

FOREIGN PATENT DOCUMENTS

| | | |
|---|---|---|
| CN | 102946313 | 2/2013 |
| CN | 104486307 | 4/2015 |
| CN | 104579694 | 4/2015 |
| CN | 104780040 | 7/2015 |
| EP | 3007478 | 4/2016 |

OTHER PUBLICATIONS

Sufyan T. Faraj, "A Novel Extension of SSL/TLS Based on Quantum Key Distribution", Computer and Communication Engineering, 2008. ICCCE 2008. International Conference on, IEEE, Piscataway, NJ, USA, May 16, 2008, pp. 919-922.

* cited by examiner

SYSTEM AND METHOD FOR SECURE COMMUNICATION

RELATED APPLICATION

Under 35 U.S.C. § 119, this application claims the benefit and right of priority of Chinese Patent Application No. 201810005954.X, filed Jan. 3, 2018, the disclosure of which is incorporated by reference herein.

BACKGROUND

Field

This disclosure is generally related to secure communication. More specifically, this disclosure is related to a method and system that facilitates secure point-to-point communication.

Related Art

Recent developments in communication technologies have made personal communication equipment (e.g., cell phones, smartphones, laptop computers, etc.) widely available. Ordinary users can use such personal communication equipment to communicate, via voice or video images, with other users. For example, Voice over Internet Protocol (VoIP) technologies facilitate the delivery of voice and multimedia sessions over IP networks.

Current technologies for maintaining security or secrecy of voice or video communications typically rely on session keys that can be negotiated between communicating parties for encryption and decryption. However, voice communications (e.g., VoIP applications) often rely on third-party servers to forward packets, thus being vulnerable to man-in-the-middle attacks. An attacker can hack into the third-party server, which separately negotiates encryption keys with the communication parties, to eavesdrop on the decrypted communication content.

SUMMARY

One embodiment described herein provides a system and method for secure point-to-point communication. During operation, the system establishes a voice communication channel between a local client device and a remote client device and obtains an encryption key negotiated between the local client device and the remote client device. The system can then obtain a voice signal generated by a user associated with the local client device based on the encryption key and performs a key-validation operation by sending the voice signal from the local client device to the remote client device using the voice communication channel. In response to a successful validation of the encryption key, the system establishes a secure point-to-point communication channel between the local and remote client devices using the validated encryption key.

In a variation on this embodiment, obtaining the encryption key can include performing a Diffie-Hellman key exchange operation.

In a variation on this embodiment, the system can further display a fingerprint of the encryption key at the local client device.

In a further variation, the fingerprint of the encryption key can include a number of natural language words or phrases, and the voice signal can include the user's recitation of the natural language words or phrases.

In a variation on this embodiment, the system can further receive a second voice signal from the remote client device. The second voice signal is generated by a second user of the remote client device based on the voice signal and a second encryption key obtained by the remote client device. The system can then determine whether the encryption key is successfully validated based on at least the received second voice signal.

In a further variation, the second voice signal can include information associated with a fingerprint of the second encryption key, and the fingerprint of the second encryption key can include a number of natural language words or phrases.

In a further variation, the second voice signal can include the second user's recitation of the natural language words or phrases.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments disclosed herein solve the problem of improving the security in point-to-point communications (e.g., voice communications). More specifically, to ensure key security or secrecy, the communication parties can first negotiate an encryption key using a standard key-negotiation protocol. The negotiated encryption key can then be validated by the communication parties over a voice communication channel. In one embodiment, the fingerprint of the negotiated key (e.g., a hash function of the key) can be converted into a plurality of natural language phrases and displayed onto the user interface of the communication parties. One communication party can communicate verbally the displayed phrases to the other communication party, thus allowing both communication parties to validate the negotiated key based on whether the natural language phrases displayed at one end match those displayed at the other end.

Secure Point-to-Point Voice Communication

Figure 1:
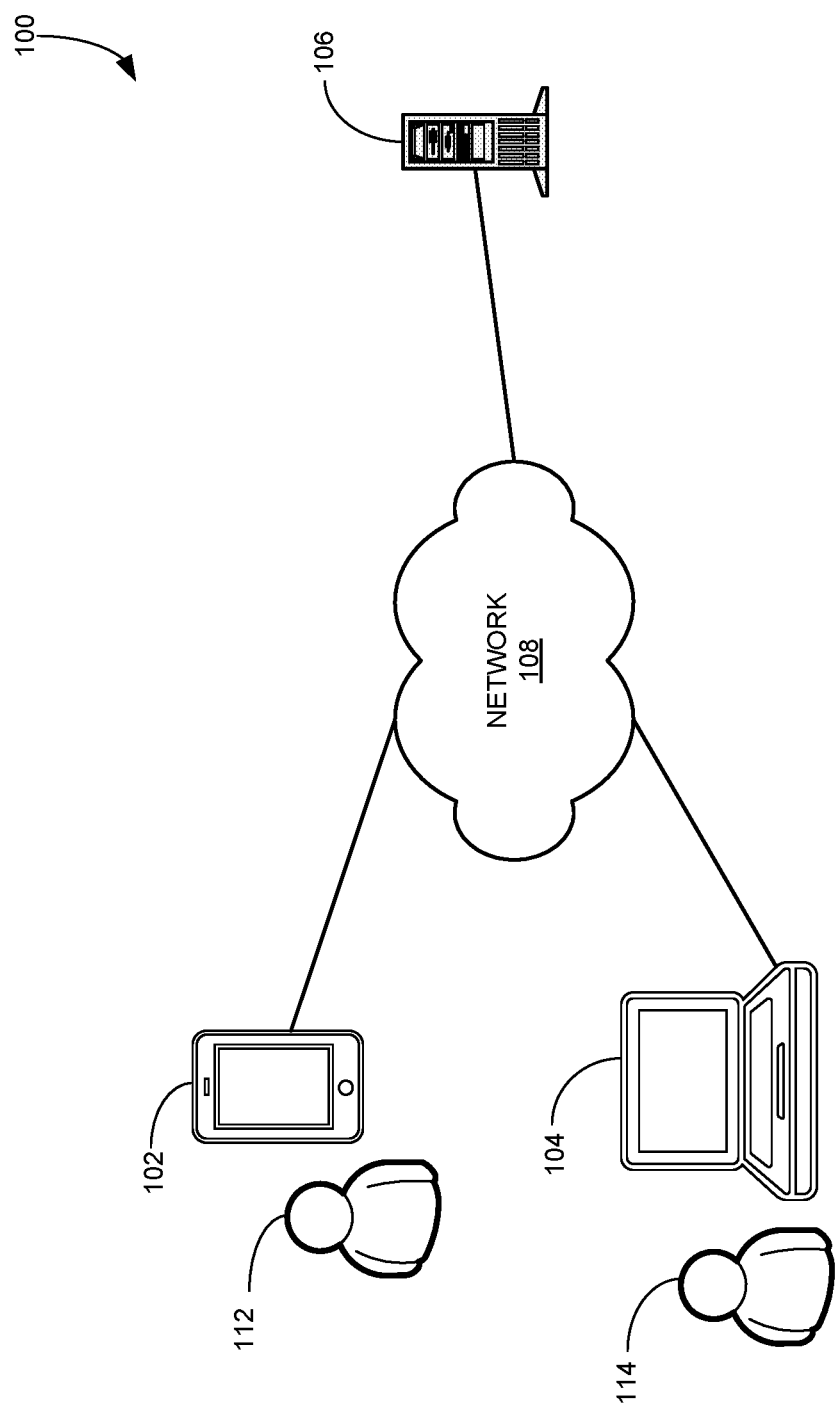
FIG. 1 illustrates an exemplary network environment for point-to-point voice communication, according to one embodiment.

FIG. 1 illustrates an exemplary network environment for point-to-point voice communication, according to one embodiment. Network environment 100 can include a number of client devices (e.g., client devices 102 and 104), a server 106, and a network 108. The client devices and server 106 are coupled to each other via network 108. A user of one client device can communicate with a user of a different client device via server 106 and network 108. For example, user 112 of client device 102 and user 114 of client device 104 can communicate (e.g., via VoIP) with each other. Such a voice communication can be facilitated by server 106 and network 108.

A client device can be any type of computing device, including but not limited to: cell phone, smartphone, smartwatch, virtual reality (VR) equipment, personal computer (PC), laptop computer, tablet computer, in-vehicle computer, smart TV, wearable devices, etc. The client device can interact with server 106 to obtain client programs, plug-ins, communication services, etc. In some embodiments, client programs running on a client device can include at least one application running on the client device, implementing the secure communication scheme.

Server 106 can be a single computing device, such as a computer server, or a cluster of computer servers. Network 108 can include, for example, any one or more of a personal area network (PAN), a local area network (LAN), a campus area network (CAN), a metropolitan area network (MAN), a wide area network (WAN), a broadband network (BBN), the Internet, and the like.

Figure 2:
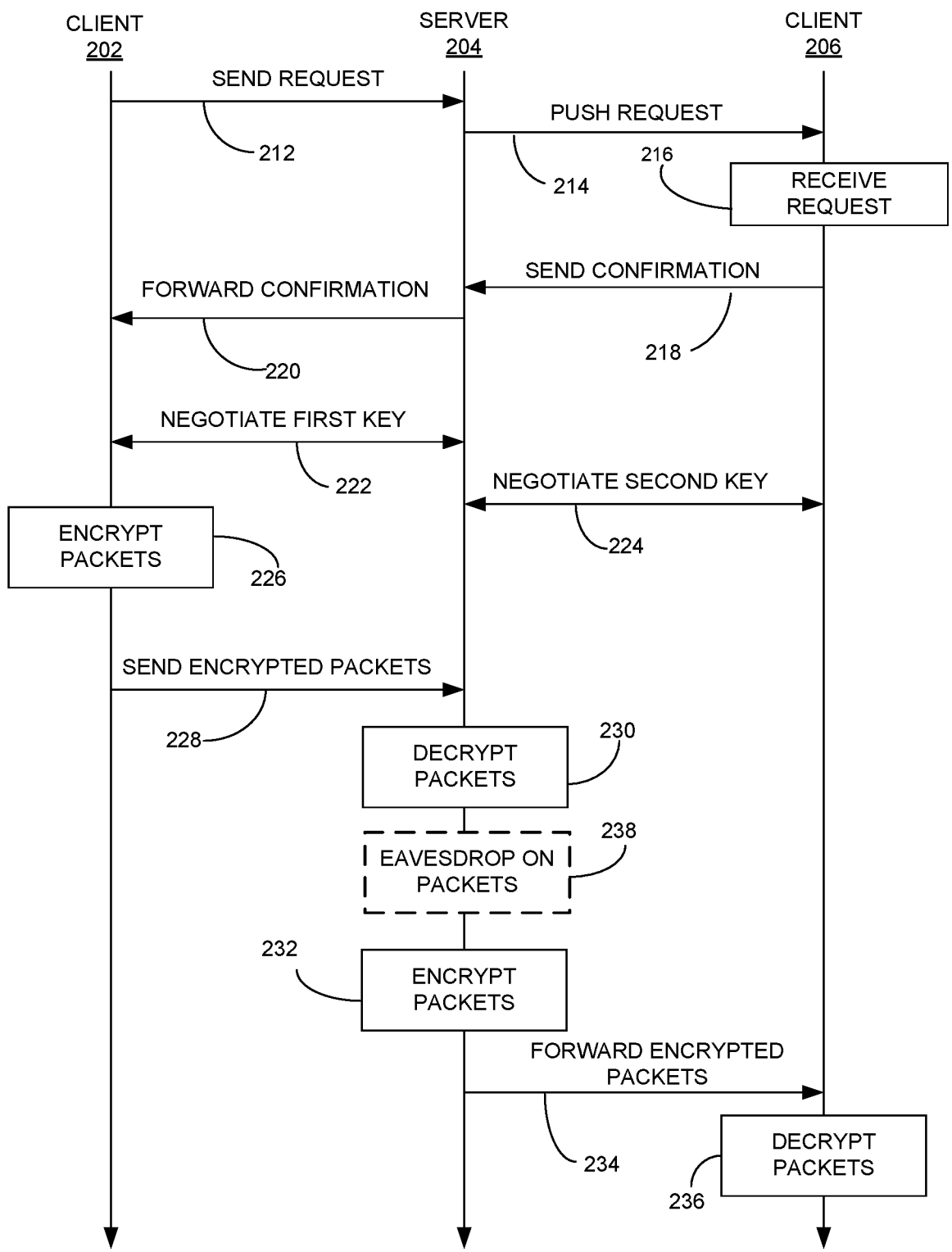
FIG. 2 illustrates a conventional process for establishing point-to-point voice communication (prior art).

Current secure-communication technologies rely on a server that separately negotiates secure keys with communication parties. However, such technologies often cannot prevent certain man-in-the-middle attacks. FIG. 2 illustrates a conventional process for establishing point-to-point voice communication (prior art). During operation, a client device 202 sends a request to server 204 for voice communication with a client device 206 (operation 212). More specifically, client device 202 can initiate a voice call to client device 206. Server 204 pushes such a request to client device 206 (operation 214). Client device 206 receives the request (operation 216) and sendS the confirmation message to server 204 (operation 218), which in turn forwards the confirmation message to client device 202 (operation 220). Such a confirmation message notifies client device 202 that client device 204 has picked up the call and is ready to start voice communication.

Client device 202 and server 204 together negotiate a first secret key using a standard key-negotiation procedure (operation 222). The first secret key can be used for secure communication between client device 202 and server 204. Similarly, client device 206 and server 204 can negotiate a second secret key using a standard key-negotiation procedure (operation 224). The second secret key can be used for secure communication between client device 206 and server 204.

Subsequent to negotiating the first secret key, client device 202 can encrypt data packets containing voice messages using the first secret key (operation 226) and send the encrypted packets to server 204 (operation 228). Server 224 decrypts the received packets using the first secret key (operation 230), encrypts the decrypted packets using the second secret key (operation 232), and forwards the encrypted packets to client device 206 (operation 234). Client device 206 can then decrypt the received packets to obtain the voice message (operation 236).

As one can see from FIG. 2, the packets may remain unprotected on server 204 after server 204 decrypts the packets using the first secret key and before server 204 encrypts the packets using the second secret key. It is possible that a malicious attacker gains access to server 204 to eavesdrop on these unprotected packets (operation 238). Conventional technologies cannot guarantee the security of the point-to-point voice communication.

To overcome this problem, in some embodiments, instead of relying on the server to separately negotiate secret keys with the communication parties, the system allows the communication parties to directly negotiate a secret key that can be used for secure communication. Moreover, the secret key can be validated using natural language exchanged via a voice channel.

Figure 3:
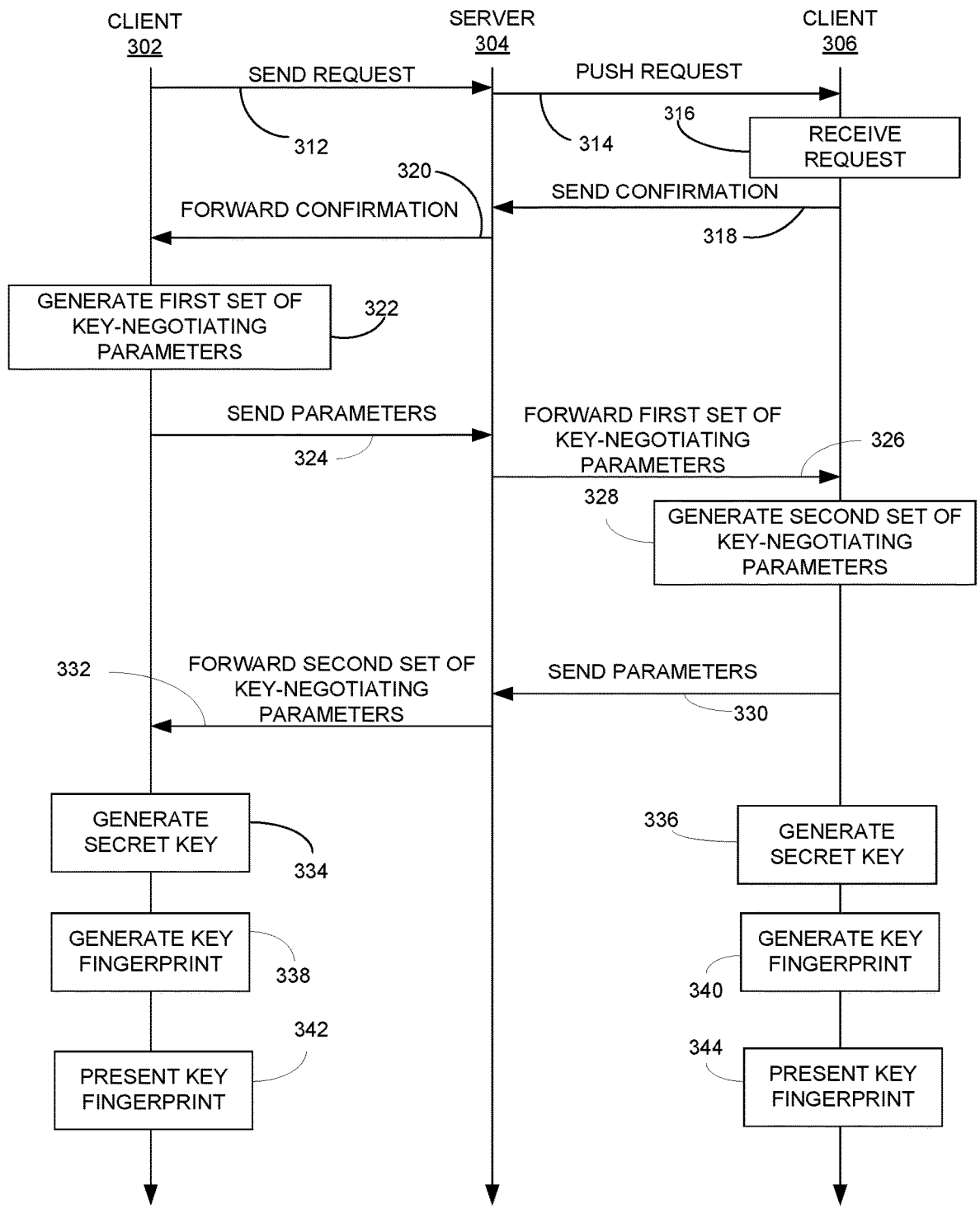
FIG. 3 illustrates an exemplary process for establishing a secure point-to-point communication channel, according to one embodiment.
Figure 3:
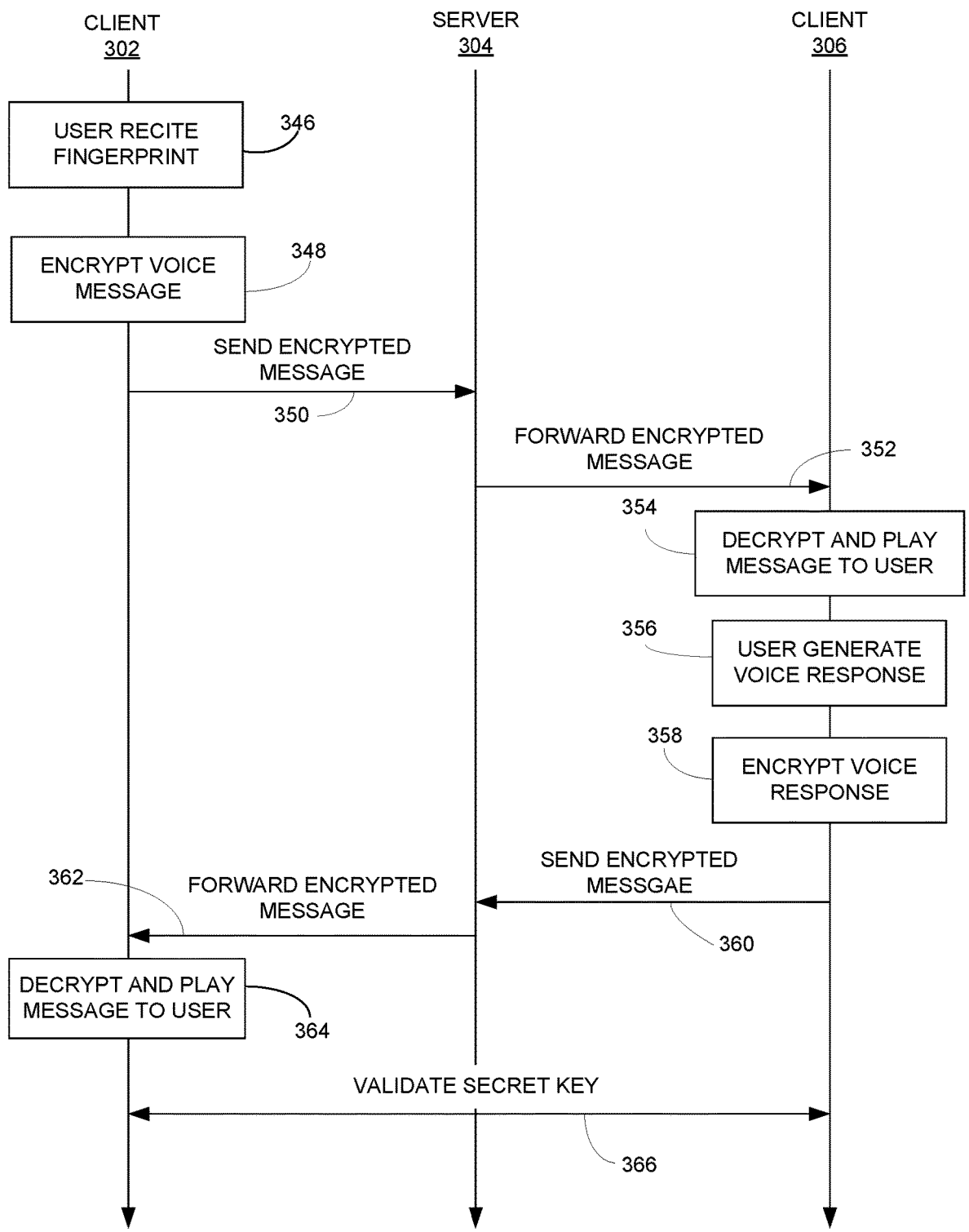

FIG. 3 illustrates an exemplary process for establishing a secure point-to-point communication channel, according to one embodiment. During operation, a client device 302 sends a request to server 304 for establishing a secure point-to-point secure communication channel with a remote client device 306 (operation 312). For example, client device 302 can initiate a secure voice call to remote client device 306. Upon receiving such a request, server 304 pushes the request to client device 306 (operation 314). Client device 306 receives the request (operation 316) and sends the confirmation message to server 304 (operation 318), which in turn forwards the confirmation message to client 302 (operation 320). Such a confirmation message notifies client device 302 that client device 304 has picked up the call and is ready to start communication.

Figure 4A:
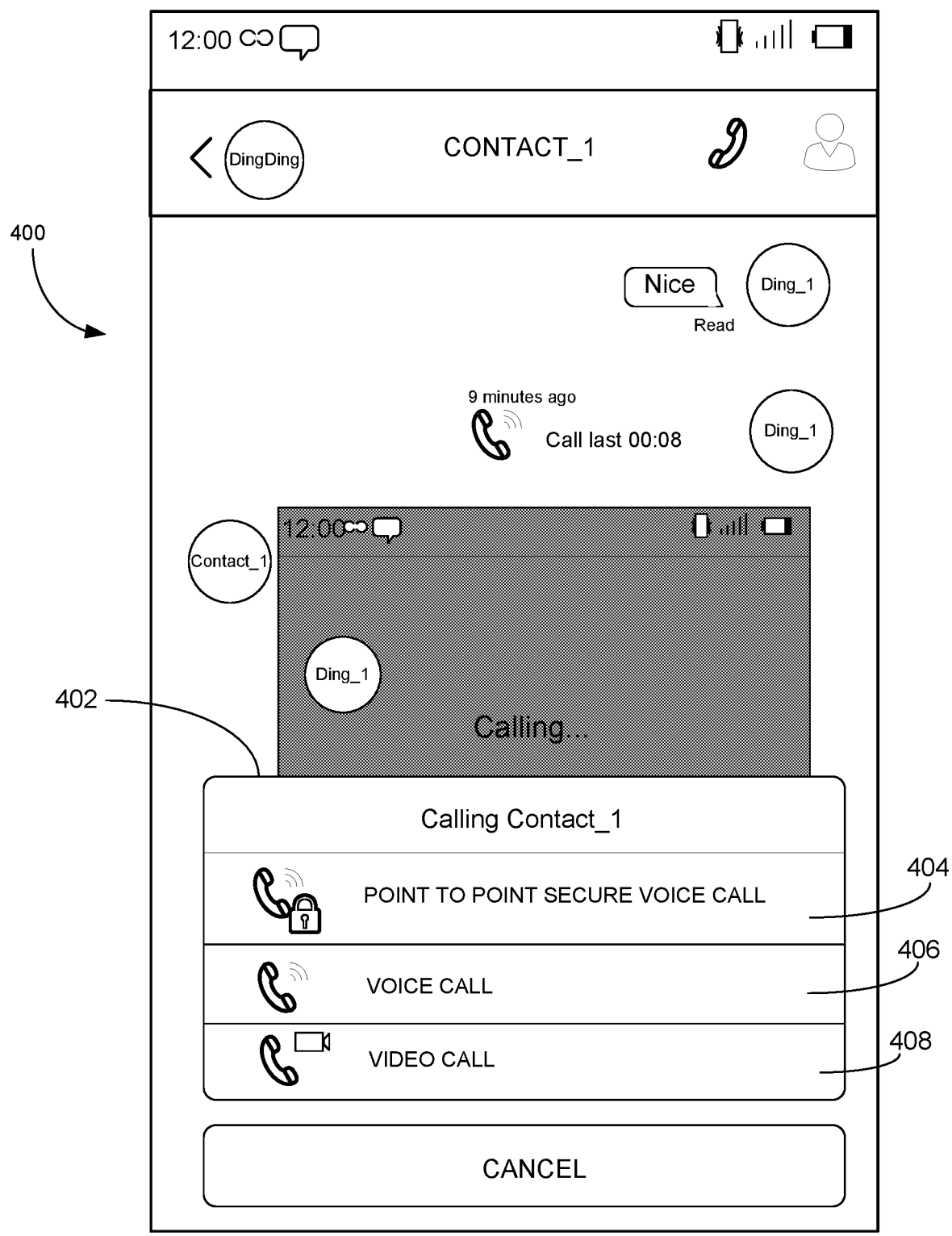
FIG. 4A illustrates an exemplary user interface for initializing point-to-point secure communication, according to one embodiment.

FIG. 4A illustrates an exemplary user interface for initializing point-to-point secure communication, according to one embodiment. In FIG. 4A, user interface 400 can be a touchscreen user interface for an instant messaging (IM) application running on a mobile device. User interface 400 can include a call area 402. A user can make a selection in call area 402 to communicate with a remote user. In the example shown in FIG. 4A, call area 402 can include a number of communication options, such as option 404 for point-to-point secure voice communication, option 406 for regular voice communication, and option 408 for video communication. The user can select one of the options by tapping on the corresponding screen area.

Figure 4B:
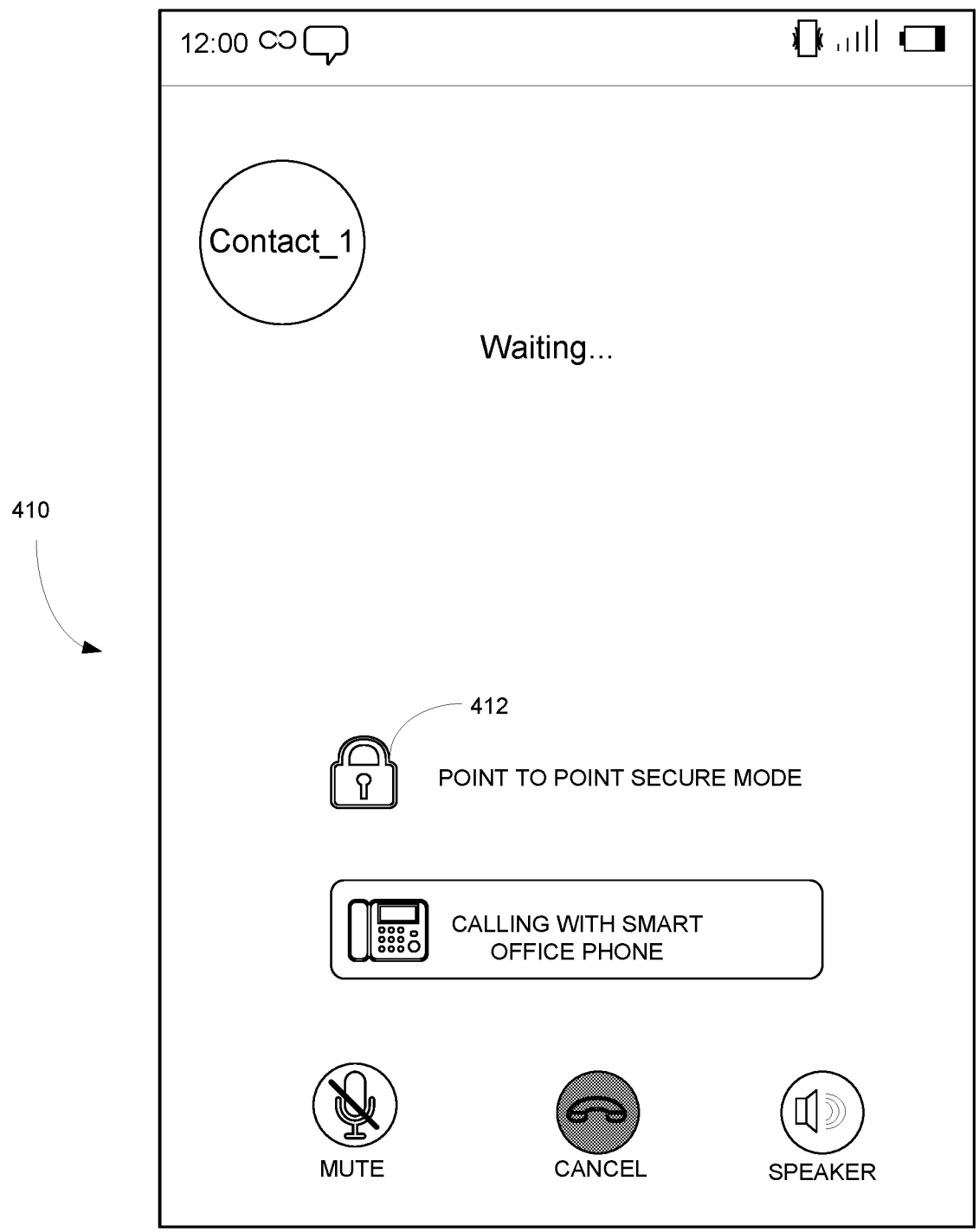
FIG. 4B illustrates an exemplary user interface for initializing point-to-point secure communication, according to one embodiment.

FIG. 4B illustrates an exemplary user interface for initializing point-to-point secure communication, according to one embodiment. More specifically, FIG. 4B shows a user interface 410 displayed on the touchscreen after the user selects option 404 for point-to-point secure voice communication. An icon 412 displayed in user interface 410 indicates that the current communication is in a secure mode. FIG. 4B also shows that the system is waiting for the secure communication channel to be established.

In the example shown in FIGS. 4A-4B, the point-to-point secure communication (e.g., a secure voice communication) is initialized in an instant messaging application running on a mobile computing device. In practice, the request for starting point-to-point secure communication, including both voice communication and video communication, can be initialized or started by a user in other types of communication applications, such as an Internet-phone application, a video-conference application, etc.

Returning to FIG. 3, subsequent to receiving the confirmation message, client device 302 can start the key-negotiation process by generating a first set of key-negotiating parameters (operation 322) and sending the first set of key-negotiating parameters to server 304 (operation 324). Because server 304 does not participate in negotiating a secret key between client devices 302 and 306, server 304 simply forwards the first set of key-negotiating parameters to client device 306 (operation 326). On the other hand, client device 306 generates a second set of key-negotiating parameters (operation 328) and sends the second set of key-negotiating parameters to server 304 (operation 330). Similarly, server 304 forwards the second set of key-negotiating parameters to client device 302 (operation 332). Now both client devices 302 and 306 have in their possession the first and second sets of key-negotiating parameters. Consequently, each of client devices 302 and 306 can generate, based on the first and second sets of key-negotiating parameters and a predetermined key-generation rule or protocol, a secret key that can be used for establishing a secure communication channel between client devices 302 and 306 (operations 334 and 336).

Various key-negotiating rules or protocols can be used for generating the secret key or keys. In some embodiments, the secret key can be a symmetric key shared between client devices 302 and 306. In other words, each client device generates an identical key and can later use such an identical key for encryption and decryption. For example, the identical key can be a key used during an Advanced Encryption Standard (AES) encryption process. Alternatively, the keys generated by client devices 302 and 306 can be asymmetric. In other words, client devices 302 and 306 can generate different keys that are logically correlated. Client devices 302 and 306 can use such asymmetrical keys for encryption and decryption. In some embodiments, the entire key-negotiation process (e.g., operations 322 through 336) can follow a known key-negotiating protocol, such as the Diffe-Hellman key exchange protocol. In such a scenario, each client device generates the secret key based on both the exchanged information (e.g., the first and second sets of parameters) as well as secret or private information kept or maintained by each client device. This way, even if server 304 is attacked by a malicious user to expose the first and second sets of parameters, the secret key itself can still be kept safe. However, there is still the risk that compromised server 304 swaps out the key-negotiating parameters from the client devices to separately negotiate keys with the client devices, posing as a client device.

To overcome this problem, in some embodiments, the generated secret key needs to be validated. More specifically, to ensure security and efficiency, the key validation can be performed manually by users of client devices 302 and 306. To facilitate the subsequent key-validation process, each client device generates a fingerprint of the negotiated key based on predetermined fingerprint-generating rules (operations 338 and 340). The fingerprint can later be used for key validation. The fingerprint of the key can have various formats and be generated using various mechanisms. For example, the fingerprint can be a hash function of a key. Most encryption keys can include alphanumeric strings, making manual validation (e.g., reciting of the key by a user) cumbersome. On the other hand, natural language words or phrases can be recited much more easily by users. In some embodiments, the fingerprint of a key can be in the form of a plurality of natural language words or phrases. A particular mapping mechanism (e.g., hashing or computing a hash function) can be used to map the alphanumeric strings included in a key to a plurality of natural language phrases. For example, a particular letter or number can be mapped to a particular word. Alternatively, a particular combination of letters and/or numbers can be mapped to a particular word or phrase. The latter option can map a long alphanumeric string to a few (e.g., ten or fewer) words or phrases, thus resulting in more efficient key validation. Because the phrases or words in a certain type of natural language (e.g., English or Chinese) can be vast, the possibility of hash collision can be low.

Subsequent to generating the fingerprint of the secret key, client devices 302 and 306 can each present such a fingerprint to the user (operations 342 and 344). In some embodiments, the fingerprint of the key can be presented to the users on a display associated with each client device.

Figure 5:
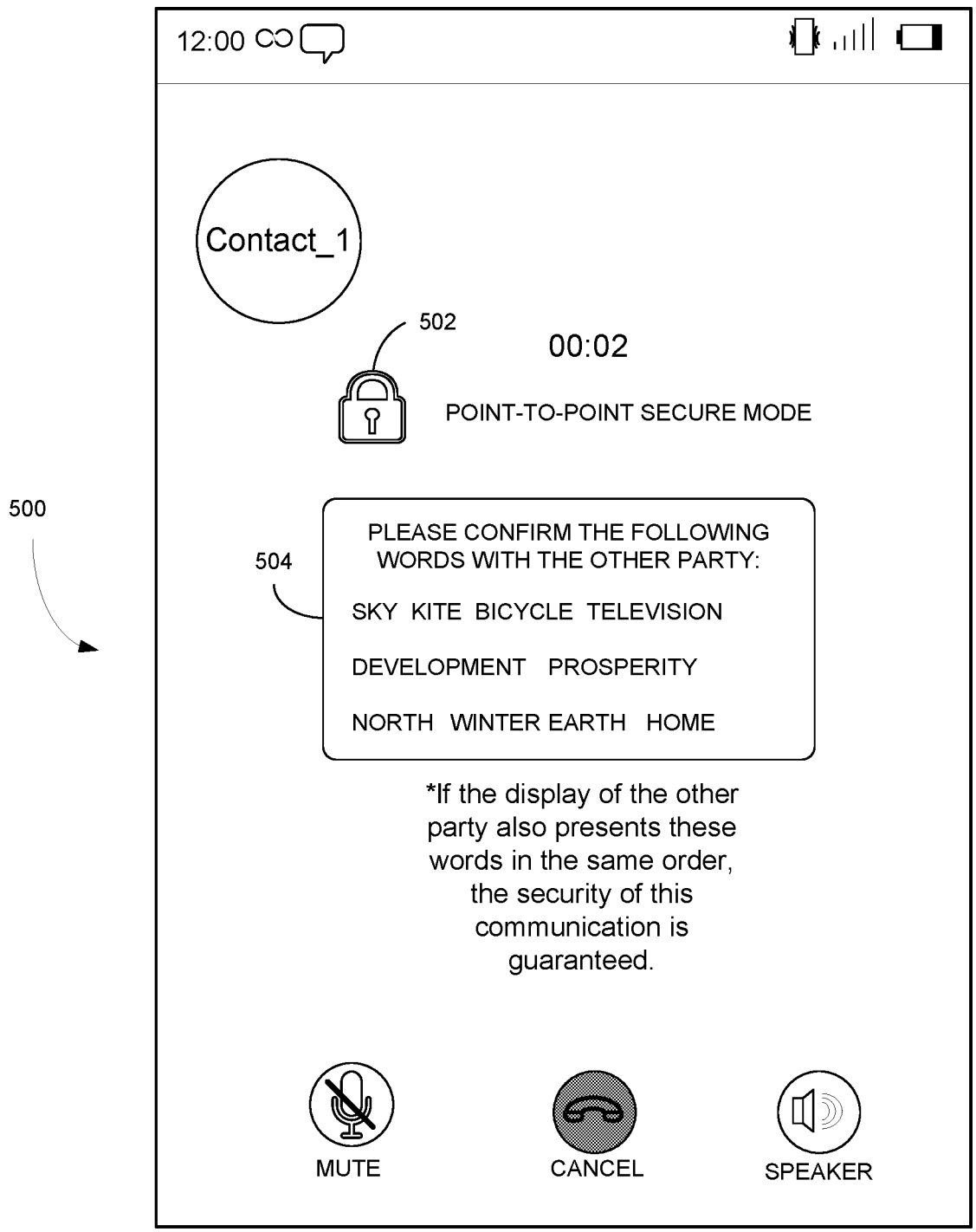
FIG. 5 shows an exemplary user interface displaying the fingerprint of the secret key, according to one embodiment.

FIG. 5 shows an exemplary user interface displaying the fingerprint of the secret key, according to one embodiment. In FIG. 5, user interface 500 includes an icon 502 indicating that the point-to-point communication is performed in a secure mode. User interface 500 can also include a key-fingerprint-display area 504 that displays the fingerprint of the secret key. In this example, the fingerprint of the secret key includes a set of natural language words in English, including: sky, kite, bicycle, television, development, prosperity, north, winter, earth, and home. Key-fingerprint-display area 504 can also display user prompts that prompt the user of the client device to recite, over a voice channel, the displayed natural language phraseS to the user of the remote client device. Similarly, the remote client device also displays the fingerprint of its secret key to its user. If the keys are symmetric, the fingerprints will be the same, and the natural language words or phrases displayed on the client devices should be identical. Note that only the fingerprint, not the secret key itself, is displayed to users, thus preventing the leakage of the secret key in the event of a malicious user somehow obtaining the screenshot of the client device. In some embodiments, the keys can be asymmetric, meaning that the secret keys generated at the two client devices are different. However, because the asymmetric keys are logically related to each other, it is still possible for the system to generate identical fingerprints for the asymmetric keys.

In the example shown in FIG. 5, user interface 500 also indicates to the user that the security of the communication channel can be guaranteed if the natural language words or phrases recited by one user match the words or phrases displayed on the client device of the other user. In other words, if one can verify that the fingerprints of the secret key displayed on both client devices match, one can validate the secret key or guarantee the security of the communication channel. In the example shown in FIG. 5, the verification of the fingerprints is performed manually by the users over the voice channel. Note that it does not matter which user recites the displayed natural language words or phrases, as long as one party recites the words or phrases to allow the other party to check for consistency and to verbally communicate the result in return. For example, after one user recites the phases, the other user can communicate, also via the voice channel, whether the remotely recited the words or phrases match the words or phrases displayed for him locally. If they match, both users can determine that the communication is secure and continue their communication. Otherwise, the users can determine that the communication is insecure and terminate the communication. The users can further send an incident report about the security breach to system administrators.

Returning to FIG. 3, subsequent to obtaining the fingerprint of the previously negotiated secret key (e.g., by viewing the natural language phrases displayed on client device 302), the user of client device 302 can verbally recite the fingerprint (operation 346). Client device 302 subsequently encrypts the voice message containing the fingerprint using the secret key (operation 348) and sends the encrypted voice message to server 304 (operation 350). Server 304 then forwards the encrypted voice message to client 306 (operation 352).

Upon receiving the encrypted voice message, client device 306 decrypts and plays the message to the user of client device 306 (operation 354). Based on the played voice message, the user of client device 306 generates a voice response (operation 356). For example, the voice response can indicate whether the natural language words or phrases recited by the user of client device 302 match the words or phrases displayed on client device 306. Client device 306 can then encrypt the voice response using the secret key (operation 358) and sends the encrypted voice response to server 304 (operation 360). Server 304 then forwards the encrypted voice response to client device 302 (operation 362). Client device 302 then decrypts and plays the voice response to the user of client device 302 (operation 364). Based on the voice response, users of client devices 302 and 306 can collectively validate the secret key (operation 366). More specifically, if the voice response from the user of client device 306 indicates that the natural language words or phrases recited by the user of client device 302 match the words or phrases displayed on client device 306, both users can be confident that the communication channel is secure and can continue with voice communication over this secure channel. Otherwise, the users are aware that the communication channel is not secure. They can then choose to continue conversation knowing that the channel is not secure or terminate the conversation. In some embodiments, in the event of the key validation failing, each client device may send a security report to server 304 or other agencies in charge of security. After the secret key has been successfully validated, the users of client devices 302 and 306 can communicate with other via the secure communication. In addition to voice communication, other types of communication, such as exchange of text, video, and files, can also be performed by the users.

Figure 6:
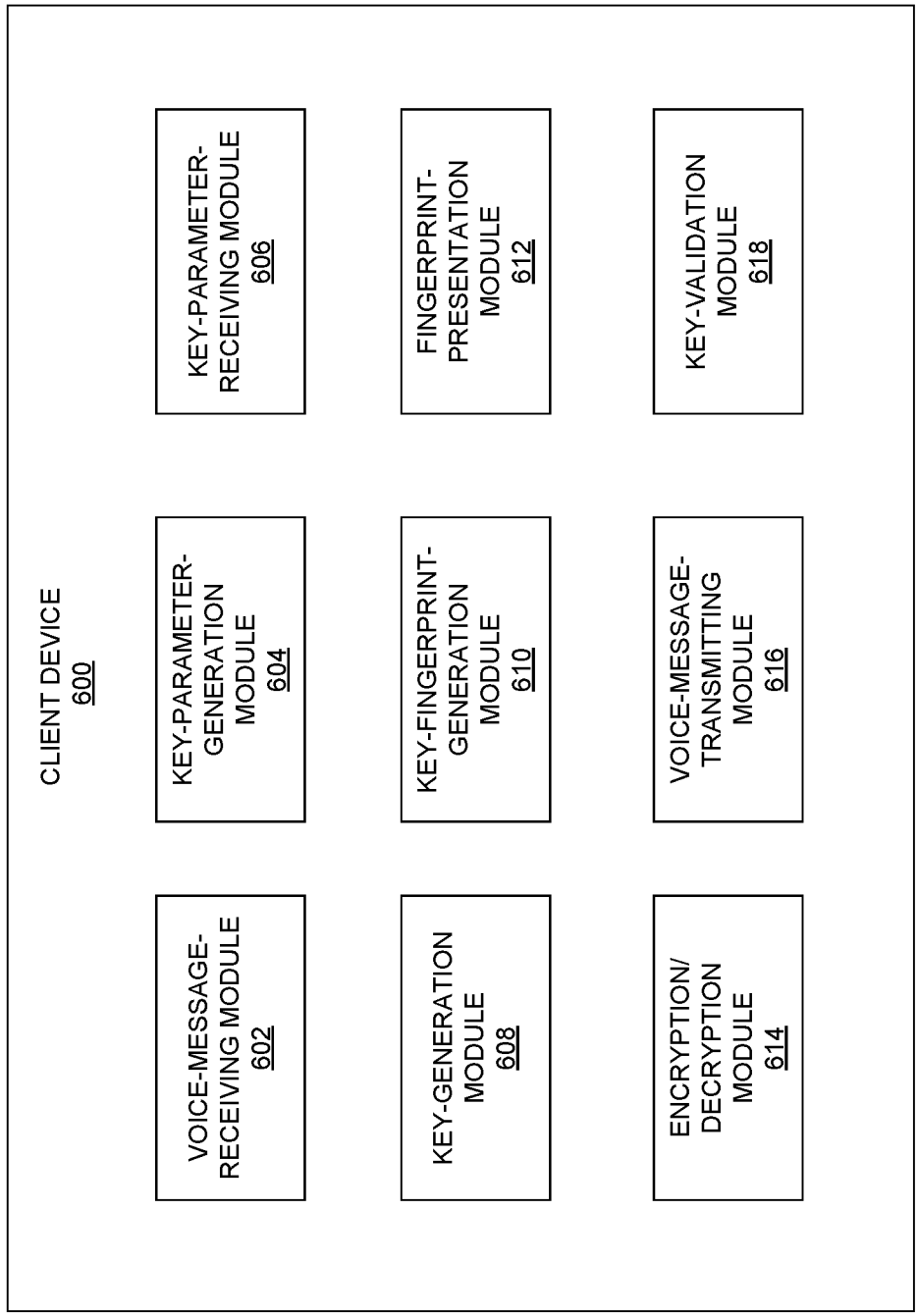
FIG. 6 illustrates the architecture of an exemplary client device, according to one embodiment.

FIG. 6 illustrates the architecture of an exemplary client device, according to one embodiment. Client device 600 can include a voice-message-receiving module 602, a key-parameter-generation module 604, a key-parameter-receiving module 606, a key-generation module 608, a key-fingerprint-generation module 610, a fingerprint-presentation module 612, an encryption/decryption module 614, a voice-message-transmitting module 616, and a key-validation module 618.

Voice-message-receiving module 602 can be responsible for receiving voice messages either from a local user or from a remote device (e.g., a remote client or server device). In some embodiments, to receive the voice message from a local user, voice-message-receiving module 602 can include a microphone built into client device 600.

Key-parameter-generation module 604 can be responsible for generating a set of parameters that will later be used for key negotiation. In some embodiments, the parameters can be generated based on one or more pre-determined rules. Depending on the type of key (e.g., symmetric or asymmetric) and depending on the key-exchange protocol (e.g., Diffe-Hellman), the rules used for generating the parameters can be different. Key-parameter-receiving module 606 can be responsible for receiving, from a remote client device, parameters for generating an encryption key. Key-generation module 608 can be responsible for generating a secret key based on both the locally generated key parameters and the key parameters received from the remote client device. In some embodiments, in addition to the locally generated parameters and remotely generated parameters, key-generation module 608 can also generate the key based on a set of shared parameters. More specifically, the shared parameters are a set of parameters that have been previously shared between the local and remote client devices. In further embodiments, the generated secret key can be a symmetric key having a predetermined length, such as an AES-128 or AES-256 key.

Key-fingerprint-generation module 610 can be responsible for generating a fingerprint of the secret key. In some embodiments, key-fingerprint-generation module 610 can calculate a hash function (e.g., Secure Hash Algorithm (SHA)-256) of the secret key. In alternative embodiments, key-fingerprint-generation module 610 can map the secret key or the calculated hash function of the secret key to a number of natural language words or phrases. Depending on the language setting of the system, key-fingerprint-generation module 610 can generate the fingerprint of the key in the form of natural language words or phrases in a particular language (e.g., English or Chinese). In addition to words and phrases, the fingerprint can also include syllables. More specifically, key-fingerprint-generation module 610 can maintain a character-to-syllable mapping table, and each character (e.g., a letter or number) in the secret key can be mapped to a syllable. In addition to natural language words or syllables, the fingerprint of the secret key can also include a set of images. A user of client device 600 can verbally recite the words or syllables, or describe the images, thus facilitating key validation.

Fingerprint-presentation module 612 can be responsible for presenting the fingerprint of the secret key to the user of client device 600. In some embodiments, fingerprint-presentation module 612 can display, on a display associated with client device 600, the fingerprint (e.g., texts or images) of the secret key. In alternative embodiments, fingerprint-presentation module 612 may play a voice message, which includes the fingerprint, to the user. If the fingerprint includes words, the voice message can include recitation of the words; and if the fingerprint includes images, the voice message can include description of the images. For example, if the image includes a car, the voice message can describe the make, model, and color of the car.

Encryption/decryption module 614 can be responsible for encrypting and decrypting the voice signals (e.g., pre-recorded messages or real-time voice signals) exchanged between client device 600 and a remote client device. Depending on the type of secret key generated by key-generation module 608, different encryption/decryption techniques can be used. In some embodiments, encryption/decryption module 614 can include a block cipher, and applies an AES technique for the encryption/decryption operation.

Voice-message-transmitting module 616 can be responsible for transmitting the voice signals from client device 600 to a remote client device. The voice signals can include normal conversation between users. Moreover, the voice signals can also be used for key validation by including information associated with the fingerprint of the secret key and by including a user's response to the other user's description of the fingerprint. Key-validation module 618 can be responsible for validating the secret key based on the voice exchange between the users. In some embodiments, key-validation module 618 can display, in the user interface, a button to allow either user to report whether the key validation succeeds at his end. Note that a successful validation requires that both users report a successful validation. On the other hand, if any user reports failure, the secret key is invalidated and the attempt to establish a secure communication channel fails.

Figure 7:
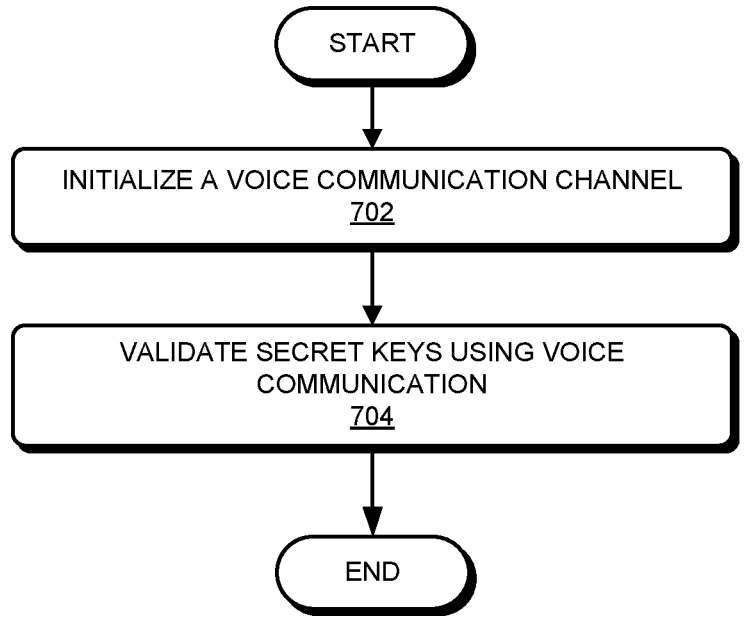
FIG. 7 presents a flowchart illustrating an exemplary client process for secure voice communication, according to one embodiment.

FIG. 7 presents a flowchart illustrating an exemplary client process for secure voice communication, according to one embodiment. During operation, the user of a client device can initialize a voice communication channel with the other communication party, such as the user of a remote client device (operation 702). The client devices can be any type of computing device capable of voice communication, such as a smartphone or a laptop computer. In some embodiments, a local user can initialize such a communication channel by calling, via an application, the remote user. For example, the local user can launch a communication application (e.g., a voice call application or an IM application) and initialize the voice communication channel through a communication user interface of the application. More specifically, the local user can make a call to the remote user by selecting the corresponding entry in a contact list of the communication application or by dialing a phone number. In some embodiments, the communication channel can be protected by a secret key negotiated between the local client device and the remote client device.

Subsequently, the users can validate one or more secret keys using voice communication carried over the voice communication channel (operation 704). Because voice communication naturally involves participation of users, the key validation over the voice channel can also involve user participation. Such a manual key-validation process has a lower complexity and, hence, is capable of providing fast and accurate key-validation results. Moreover, because human users are often more intelligent and robust than automated systems, the manual key-validation mechanism can be more suitable for certain more complex or novel communication environments. It can ensure the reliability and security of the secret key(s), thus ensuring communication security.

In some embodiments, the communication devices (e.g., the client devices) can collect user's voice signals and send such voice signals to communication parties via the voice communication channel. The voice signals can include information associated with the secret key. By presenting the voice signals to the users, the system allows the users to validate the secret key. In some embodiments, a user can validate the secret key based on voice signals collected from other users participating in the voice communication. More specifically, the local client device can collect voice signals of the local user and can receive voice signals from other users participating in the voice communication. The key validation can be performed based on both the locally collected voice signals as well as the remote voice signals. In practice, any user participating in the voice communication can validate the key based on the local voice data as well as the remote voice data. In addition to the manual validation by the users thorough voice conversation, in some embodiments, the key validation can also be performed by a local client machine, the voice server, or the remote client machine. The key validation can be based on the content of the user's voice conversation. For example, the client machine can perform voice recognition in order to extract information associated with the secret key from the users' voice conversations.

Figure 8:
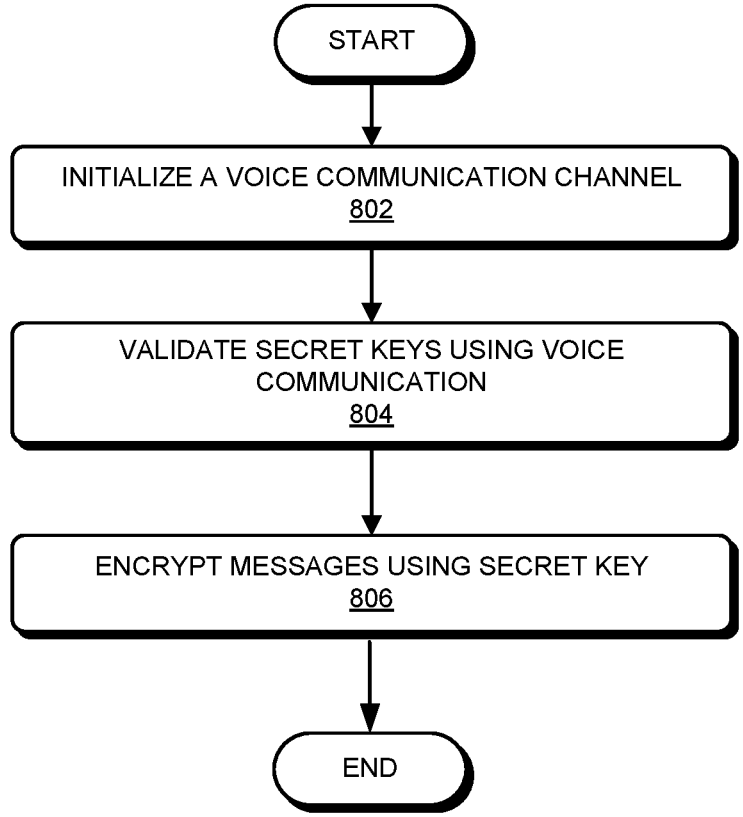
FIG. 8 presents a flowchart illustrating an exemplary client process for secure voice communication, according to one embodiment.

FIG. 8 presents a flowchart illustrating an exemplary client process for secure voice communication, according to one embodiment. During operation, the user of a client device can initialize a voice communication channel with the other communication party, such as the user of a remote client device (operation 802). Operation 802 can be similar to operation 702 shown in FIG. 7. Furthermore, the user of the client device can launch a communication application on the client device and starts voice communication with a remote user via a user interface associated with the communication application. The voice communication can include voice messages and real-time voice conversion.

Subsequently, the client device can validate a secret key based on the voice communication process and content (operation 804). Operation 804 can be similar to operation 704 shown in FIG. 7. After successful validation of the secret key, the client device can encrypt subsequent messages using the validated key (operation 806). In some embodiments, the client device can encrypt the messages using an AES encryption algorithm and send the encrypted messages to other client devices. A remote client device receiving the encrypted message can perform a decryption operation using a corresponding secret key. In the event of unsuccessful validation of the secret key, the system can apply one or more predetermined communication-risk-management rules to manage subsequent communications. The risk-management rules can be previously obtained from a service provider server or defined by users of the client devices. For example, the risk-management rules can include a rule that automatically terminates the communication in response to an unsuccessful validation of the secret key. Alternatively, the risk-management rules can include a rule that allows the voice communication to continue but displays in the user interface (e.g., user interface 500 shown in FIG. 5) a warning sign, indicating that the communication channel is not secure. Additional risk-management rules can also include rules for recording in the system log the event of unsuccessful validation and reporting such an event to a remote service provider server. Moreover, recording such an event can include recording one or more of: the parties participating in the communication, the time of the communication, the status of the communication, the reason for communication failure, etc.

In the example shown in FIG. 8, the message-encryption operation occurs subsequent to the validation of the secret key. In practice, these operations can be performed independently of each other. For example, the message encryption and key-validation operations can be performed over different communication channels. Because the users validate the secret key by comparing the fingerprint of the key, not the key itself, displayed by different client devices, it is possible that such communication can be performed over an unprotected channel. For example, the users may make separate phone calls over the public switched telephone network (PSTN) to validate the secret key that can be used for secure communication using an IM service. Alternatively, the users may communicate over a short message service (SMS) channel (e.g., by sending text or voice messages) in order to validate the secret key. The subsequent encryption of the messages then establishes a secure channel. On the other hand, it is also possible to encrypt the voice communication using a key that is not yet validated. The key is then validated to ensure security of subsequent communication. In other words, before validation of the secret key, the users should refrain from discussing sensitive information, because the security of the communication channel is not yet guaranteed.

Figure 9:
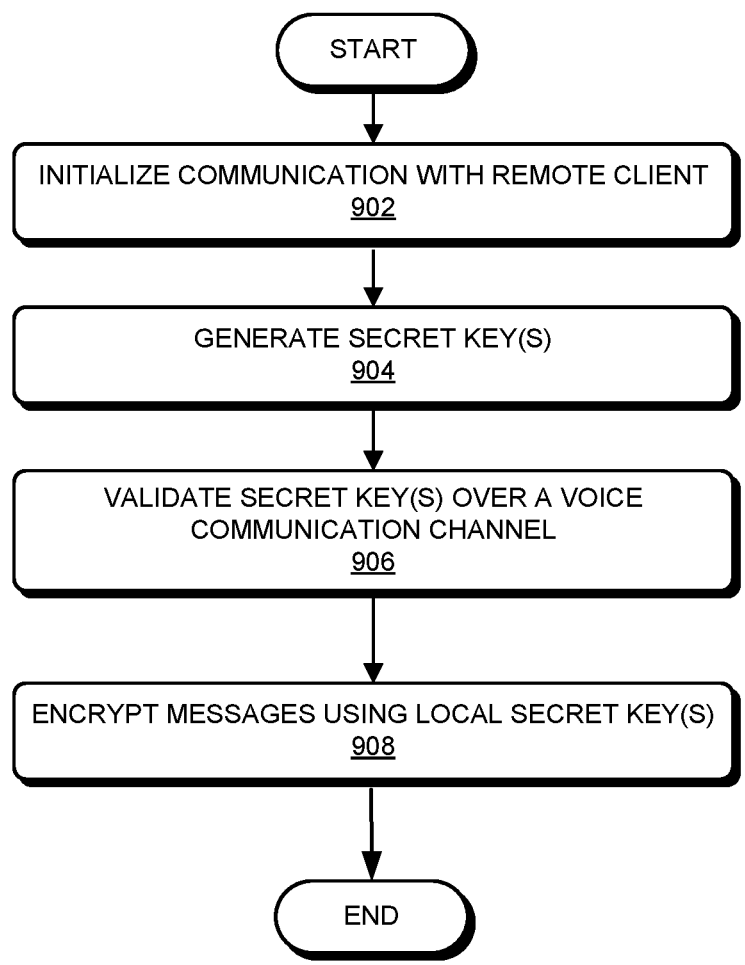
FIG. 9 presents a flowchart illustrating an exemplary client process for secure voice communication, according to one embodiment.

FIG. 9 presents a flowchart illustrating an exemplary client process for secure voice communication, according to one embodiment. During operation, a client device can initialize communication with a remote client device (operation 902). Operation 902 can be similar to operation 702 or 802. The client device can generate one or more secret keys that can be used for establishing a secure communication channel with the remote client device (operation 904). In some embodiments, the local and remote client devices can negotiate a shared key according to a standard key-negotiation protocol, such as the Diffie-Hellman key-exchange protocol. The key-negotiation process can require parties (e.g., two or more parties) participating in the communication to exchange or share key-generation parameters. The key-generation parameters can be determined based on the key-negotiation protocol being adopted. For example, the local client device can send a first set of key-generation parameters to the remote client device and receive a second set of key-generation parameters from the remote client device. The local client device can then generate the secret key based on the first and second sets of key-generation parameters. Moreover, the local and remote client devices may also agree on a set of shared parameters, and then each generate a secret key based on the set of shared parameters together with the first and second sets of key-generation parameters.

In addition to symmetric keys, the client devices may also generate asymmetric keys that are logically related to each other. The logical relationship among the asymmetric keys allows the validation of all keys based on the validation of any one key. In some embodiments, to ensure that a client device obtains key-generation parameters from all other devices in order to generate the secret key, the client device may collect key-generation parameters from other client devices following a predetermined order. In further embodiments, a client device generates its own key-generation parameters in response to receiving, from other client devices, key-generation parameters. Accordingly, each client device generates the secret key following the predetermined order. The predetermined order for generating the keys allows for the logical relationship among the keys to be maintained.

Subsequent to generating the secret key, the client device may validate the secret key over a voice communication channel (operation 906). To validate the secret key, the system can compare the secret keys generated at each client device. If the keys are identical (in the case of symmetric keys) or have a predetermined logical relationship (in the case of asymmetric keys), the system can determine that the key(s) are validated and the communication protected by such key(s) is secure. Otherwise, the key(s) are invalidated and the communication is insecure.

Using a point-to-point communication between a local client and a remote client as an example, the local and remote clients can negotiate a symmetric key that can be used for encrypting and decrypting messages exchanged between these two clients. Under normal circumstances, the local client encrypts messages using the shared key and sends the encrypted messages to a server, which then forwards the encrypted messages to the remote client. The remote client can then use the shared key to decrypt the message. During key validation, the local client and remote client can obtain, over a voice channel, the negotiated key from each other. By comparing the obtained key with the locally generated key, each client can determine whether or not the key is valid. However, when the communication between the clients is attacked (e.g., when a malicious attacker attacks or kidnaps the server), the key-negotiation process between the local and remote clients may be replaced by separate key-negotiation processes between the server and a respective client. The server can negotiate a first key with the local client and a second key with the remote client. These two keys can be used by the clients for communication with the server and the server can then obtain content of the communication between the client devices by decrypting the messages. However, because these keys are separately negotiated by the server with the two clients, they are different and do not have a logical relationship. Hence, when the local and remote clients perform the key-validation process, the validation will fail and the clients can determine that the communication or the server has been attacked.

In some embodiments, to facilitate the key validation, a local client device may present (via visual display or audio presentation) the secret key or a fingerprint of the secret key to its user. The fingerprint of the secret key can include natural language words or phrases, syllables, images, etc. The user can then generate a message based on the presented key or fingerprint. For example, the user can verbally recite the secret key or the fingerprint of the key. Alternatively, each character in the secret key can be mapped to a predetermined syllable, and the user may pronounce the syllables according to the secret key. The message can be a voice message or real-time conversation through a voice channel. The message can then be sent to the remote client device. Upon receiving the message, the user of the remote client device can determine whether the secret key associated with the received message matches the secret key generated by the remote client device. If so, the key is validated and the communication is secure. If not, the key is invalidated and the communication is not secure. To enhance the reliability of the key-validation process, in some embodiments, the key-validation may also include the process of the user of the remote client device generating a second message based on the key or fingerprint presented to him by the remote client device. The second message can then be sent to the user of the local client device to allow the user of the local client device to determine whether the key generated by the remote client device matches the locally generated key.

Subsequent to validating the locally generated secret key, the client device can encrypt subsequent messages using the locally generated secret key (operation 908). In some embodiments, to further enhance security, the secret key or keys can be updated (e.g., rotated or ratcheted). Simple key-rotation operations may not require additional key-validation operations. However, the key-ratcheting operation generates new keys that need to be validated.

In addition to relying on the user to validate the key manually, in some embodiments, a local client device may automatically generate a voice message based on the secret key or its fingerprint. Similarly, the remote client device may use a voice-recognition technique to extract, from the received voice message, information associated with the secret key or its fingerprint. Each client device may also automatically determine whether the keys generated by the different client devices match.

Figure 10:
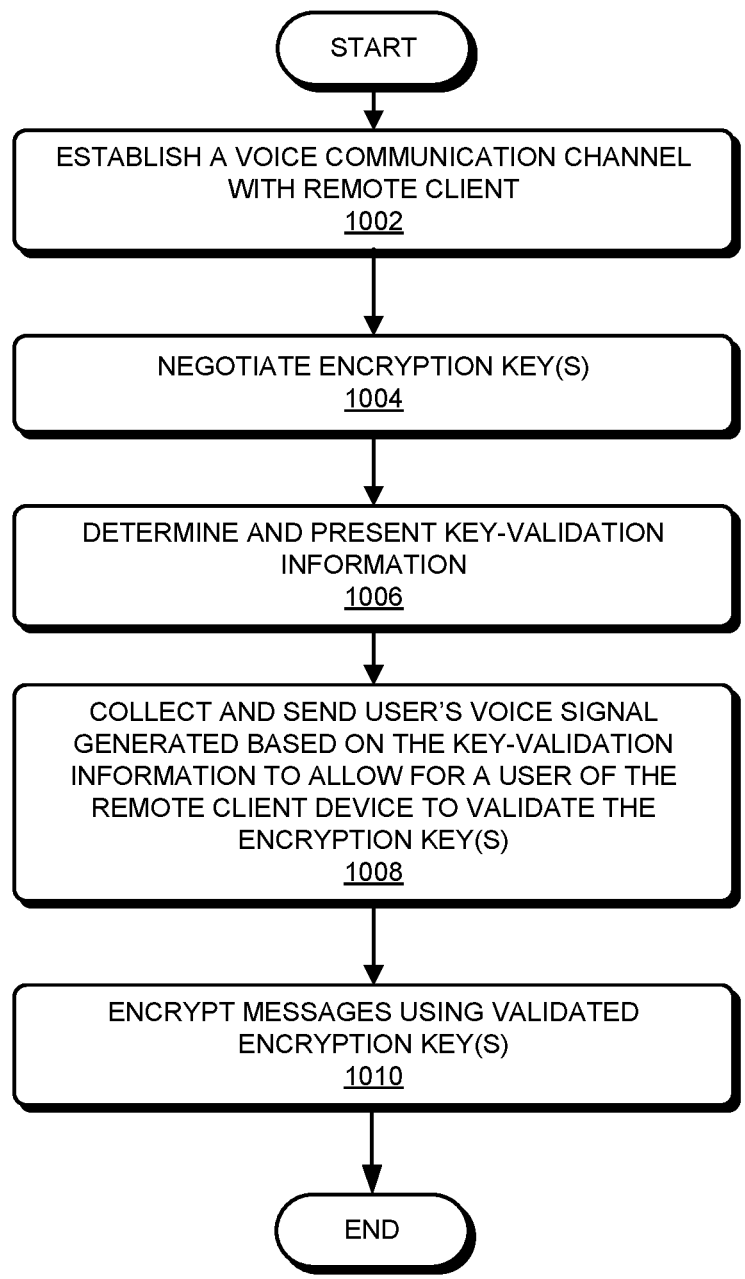
FIG. 10 presents a flowchart illustrating an exemplary client process for secure communication, according to one embodiment.

FIG. 10 presents a flowchart illustrating an exemplary client process for secure communication, according to one embodiment. During operation, a local client device establishes a voice communication channel with a remote client device (operation 1002). Local and remote client devices can negotiate one or more encryption keys (operation 1004). Depending on the key-negotiation protocol, each client device may generate an encryption key. For example, the local client device generates a first key, and the remote client device generates a second key. For symmetric encryption techniques (e.g., AES), the first and second keys may be identical.

Subsequently, the local client device can determine and present the key-validation information associated with the first key (operation 1006). In some embodiments, the key-validation information can include a fingerprint of the encryption key. To facilitate a simpler key-validation process, in some embodiments, the key-validation information can include information that can be described verbally, such as natural language words or phrases, images, pronunciation syllables, multimedia information, etc. In further embodiments, to reduce the burden of the users, the natural language words or phrases may be in a meaningful order. For example, the natural language words or phrases may include a literary quotation (e.g., from a poem, novel, movie, play, etc.). The multimedia information can also include a video or audio clip from a well-known movie, play, opera, TV show, etc. In one embodiment, generating the key-validation information can include calculating a predetermined hash function (e.g., SHA-256) of the encryption key, and then mapping the calculated hash function to natural language words or phrases. The key-validation information can be presented to the user of the local client device using visual or audio techniques. For example, the local client device can display the key-validation information to its user or play an audio clip associated with the key-validation information.

The local client device collects the user's voice signal produced by the user based on the presented key-validation information and sends the user's voice signal to the remote client device to allow the user of the remote client device to validate the encryption key based on the received voice signal (operation 1008). The local user's voice signal can include the user's description of the key-validation information displayed at the local client device. Upon receiving the voice signal, the remote client device can play the voice signal to its user to allow its user to determine whether the key generated at the local client device matches the key generated at the remote client device. The validation result can be returned to the local client device. Similarly, the remote client device can also collect its user's voice signal and send that voice signal to the local client to allow the local client to validate the key generated at the remote client device.

Subsequent to validating the encryption key, the local client device can encrypt subsequent messages sent to the remote client using the validated encryption key (operation 1010).

Figure 11:
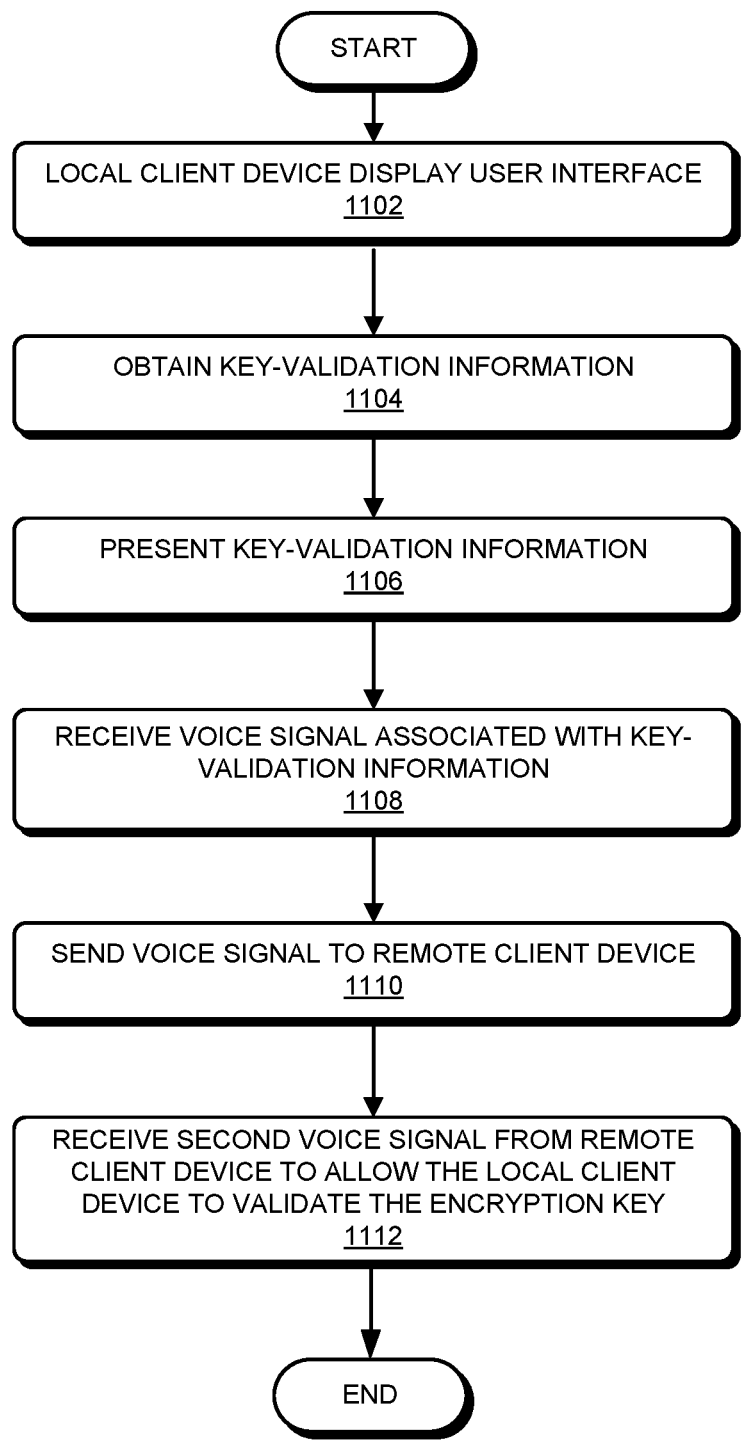
FIG. 11 presents a flowchart illustrating an exemplary process for secure data processing, according to one embodiment.

FIG. 11 presents a flowchart illustrating an exemplary process for secure data processing, according to one embodiment. During operation, a client device displays a user interface for voice communication (1102). Such a user interface can include a user interface for a particular voice communication application, such as an IM application, voice-call application, video-conference application, SMS application, etc. The user interface can present various menu items that allow the user to select a contact, launch or cancel a call, mute or turn on a speaker, record the conversation, etc. In some embodiments, the user interface can be a touchscreen user interface that allows the user to select menu items using various hand gestures on the touchscreen. Moreover, the user interface can include a pop-up window that includes menu items corresponding to various communication modes, such as point-to-point secure communication, regular voice communication, video communication, etc.

The client device can obtain key-validation information corresponding to an encryption key generated by the client device (operation 1104). More specifically, the client device can generate an encryption key that can be used to encrypt voice messages sent by the client device to a remote client device and can then generate key-validation information according to the encryption key. Both the encryption key and the key-validation information can be specific to this particular client device.

Subsequently, the client device presents key-validation information to its user (operation 1106). As discussed previously, the key-validation information can be presented to the user using visual or audio signals. Moreover, because a typical encryption key can be a long alphanumeric string, it is cumbersome for a user to recite or describe such a key verbally, whereas verbal communication can be critical for key validation. Hence, in some embodiments, the key-validation information can include items that can be recited or described verbally by human users, such as natural language words or phrases, images, syllables, etc. Such key-validation information can significantly enhance the efficiency and reliability of the key-validation process.

The client device can receive a voice signal associated with the key-validation information (operation 1108). In some embodiments, the voice signal can be generated by a human user of the client device. For example, the user can generate a voice signal by describing the key-validation information. If the key-validation information includes natural language words or phrases, the user can generate the voice signal by reciting the natural language words or phrases. If the key-validation information includes images, the user can generate the voice signal by describing the contents and/or color of the images.

The client device can then send the voice signal to a remote client device (operation 1110). Such voice signal can allow the user of the remote client device to validate the encryption key. More specifically, the user of the remote client device can generate the voice signal based on the received voice signal and corresponding key-validation signal displayed at the remote client device. In some embodiments, the user of the remote client device can extract, from the received voice signal, the key-validation information, and compare the extracted key-validation information to key-validation information displayed by the remote client device in order to determine whether the encryption keys generated by the local and remote devices match or are logically related.

In some embodiments, the local client device can receive a second voice signal from the remote client device, thus allowing the local client device to validate the encryption key based on the second voice signal (operation 1112). The second voice signal can include key-validation information displayed at the remote client device. Alternatively, the user of the remote client device generates the second voice signal by comparing the received key-validation information and the locally displayed key-validation information. In other words, the second voice signal can indicate whether the encryption keys generated by the local and remote devices match or are logically related.

In general, embodiments disclosed herein solve the problem of establishing secure point-to-point communication. Because certain point-to-point communications require that an intermediary device (e.g., a server) forwards the data packets (e.g., voice communication over the Internet), such communications can be vulnerable to man-in-the-middle (MITM) attacks. To ensure communication security by detecting possible MITM attacks, some embodiments provide a mechanism for validating encryption key(s) used by communication parties for establishing the secure communication. More specifically, the key-validation process harvests the intelligence of human users. By allowing users to use a voice communication channel to describe the key or fingerprint of the key, the system can facilitate a simple key-validation process. Moreover, to simplify the key-validation process, each encryption key can be mapped to entities that are easily described verbally by users, such as natural language words or phrases, images, syllables, etc. The key-validation information can be exchanged between users over the same communication channel that is to be protected. Alternatively, the key-validation information can be exchanged over a different communication channel. For example, the users may wish to establish a secure IM channel and they can exchange the key-validation information over a PSTN channel or an SMS channel. Because the mapping between the encryption key and the key-validation information (e.g., natural language words or phrases) can be kept secret by both users, a validated key can ensure communication security. Moreover, the human voice can also add an additional layer of security, especially in cases where the communication parties are familiar with each other's voice.

Figure 12:
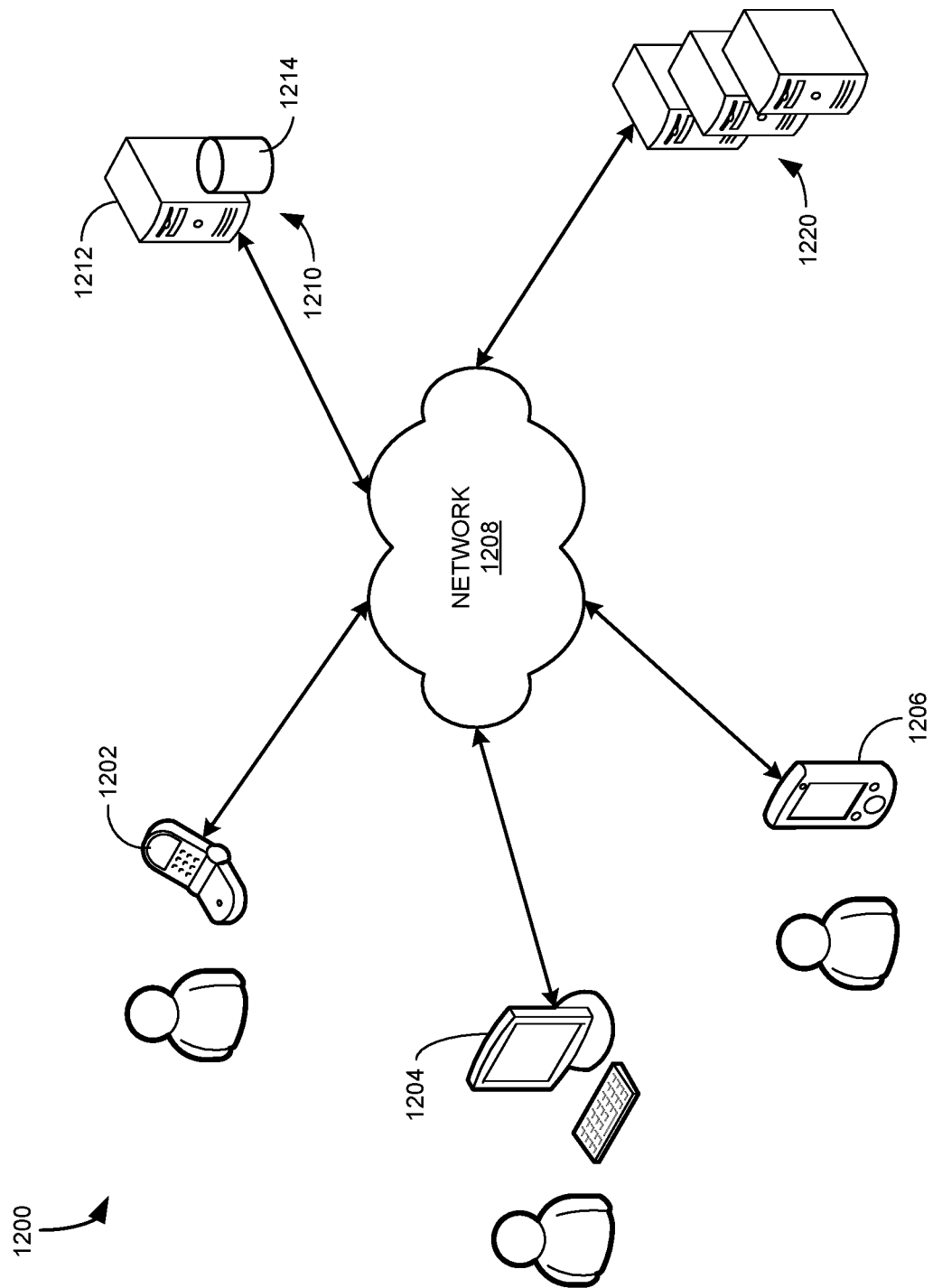
FIG. 12 illustrates an exemplary client-server network environment for implementing the disclosed technology for establishing a secure network, in accordance with some embodiments described herein.

FIG. 12 illustrates an exemplary client-server network environment for implementing the disclosed technology for establishing a secure network, in accordance with some embodiments described herein. A network environment 1200 includes a number of electronic devices 1202, 1204 and 1206 communicably connected to a server 1210 by a network 1208. One or more remote servers 1220 are further coupled to the server 1210 and/or the one or more electronic devices 1202, 1204 and 1206.

In some exemplary embodiments, electronic devices 1202, 1204 and 1206 can be computing devices such as laptop or desktop computers, smartphones, PDAs, portable media players, tablet computers, televisions or other displays with one or more processors coupled thereto or embedded therein, or other appropriate computing devices that can be used for displaying a web page or web application. In one example, the electronic devices 1202, 1204 and 1206 store a user agent such as a browser or application. In the example of FIG. 12, electronic device 1202 is depicted as a smartphone, electronic device 1204 is depicted as a desktop computer, and electronic device 1206 is depicted as a PDA.

Server 1210 includes a processing device 1212 and a data store 1214. Processing device 1212 executes computer instructions stored in data store 1214, for example, to assist in scheduling a customer-initiated service or a service-provider-initiated service between a service provider and a customer at electronic devices 1202, 1204 and 1206 during a service scheduling process.

In some exemplary aspects, server 1210 can be a single computing device such as a computer server. In other embodiments, server 1210 can represent more than one computing device working together to perform the actions of a server computer (e.g., cloud computing). The server 1210 may host the web server communicably coupled to the browser at the client device (e.g., electronic devices 1202, 1204 or 1206) via network 1208. In one example, the server 1210 may host a client application for scheduling a customer-initiated service or a service-provider-initiated service between a service provider and a customer during a service scheduling process. Server 1210 may further be in communication with one or more remote servers 1220 either through the network 1208 or through another network or communication means.

The one or more remote servers 1220 may perform various functionalities and/or storage capabilities described herein with regard to the server 1210 either alone or in combination with server 1210. Each of the one or more remote servers 1220 may host various services. For example, servers 1220 may host services providing information regarding one or more suggested locations such as web pages or websites associated with the suggested locations, services for determining the location of one or more users, or establishments, search engines for identifying results for a user query, one or more user review or query services, or one or more other services providing information regarding one or more establishments, customers and/or review or feedback regarding the establishments.

Server 1210 may further maintain or be in communication with social networking services hosted on one or more remote servers 1220. The one or more social networking services may provide various services and may enable users to create a profile and associate themselves with other users at a remote social networking service. The server 1210 and/or the one or more remote servers 1220 may further facilitate the generation and maintenance of a social graph including the user-created associations. The social graphs may include, for example, a list of all users of the remote social networking service and their associations with other users of a remote social networking service.

Each of the one or more remote servers 1220 can be a single computing device such as a computer server or can represent more than one computing device working together to perform the actions of a server computer (e.g., cloud computing). In one embodiment server 1210 and one or more remote servers 1220 may be implemented as a single server or a cluster of servers. In one example, server 1210 and one or more remote servers 1220 may communicate through the user agent at the client device (e.g., electronic devices 1202, 1204 or 1206) via network 1208.

Users may interact with the system hosted by server 1210, and/or one or more services hosted by remote servers 1220, through a client application installed at the electronic devices 1202, 1204, and 1206. Alternatively, the user may interact with the system and the one or more social networking services through a web-based browser application at the electronic devices 1202, 1204, 1206. Communication among client devices 1202, 1204, 1206 and the system, and/or one or more services, may be facilitated through a network (e.g., network 1208).

Communications among the client devices 1202, 1204, 1206, server 1210 and/or one or more remote servers 1220 may be facilitated through various communication protocols. In some aspects, client devices 1202, 1204, 1206, server 1210 and/or one or more remote servers 1220 may communicate wirelessly through a communication interface (not shown), which may include digital signal processing circuitry where necessary. The communication interface may provide for communications under various modes or protocols, including Global System for Mobile communication (GSM) voice calls; Short Message Service (SMS), Enhanced Messaging Service (EMS), or Multimedia Messaging Service (MMS) messaging; Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, including via the use of a Bluetooth-enable device, WiFi, or other such transceiver.

Network 1208 can include, for example, any one or more of a personal area network (PAN), a local area network (LAN), a campus area network (CAN), a metropolitan area network (MAN), a wide area network (WAN), a broadband network (BBN), the Internet, and the like. Further, network 1208 can include, but is not limited to, any one or more of the following network topologies, including a bus network, a star network, a ring network, a mesh network, a star-bus network, a tree or hierarchical network, and the like.

Figure 13:
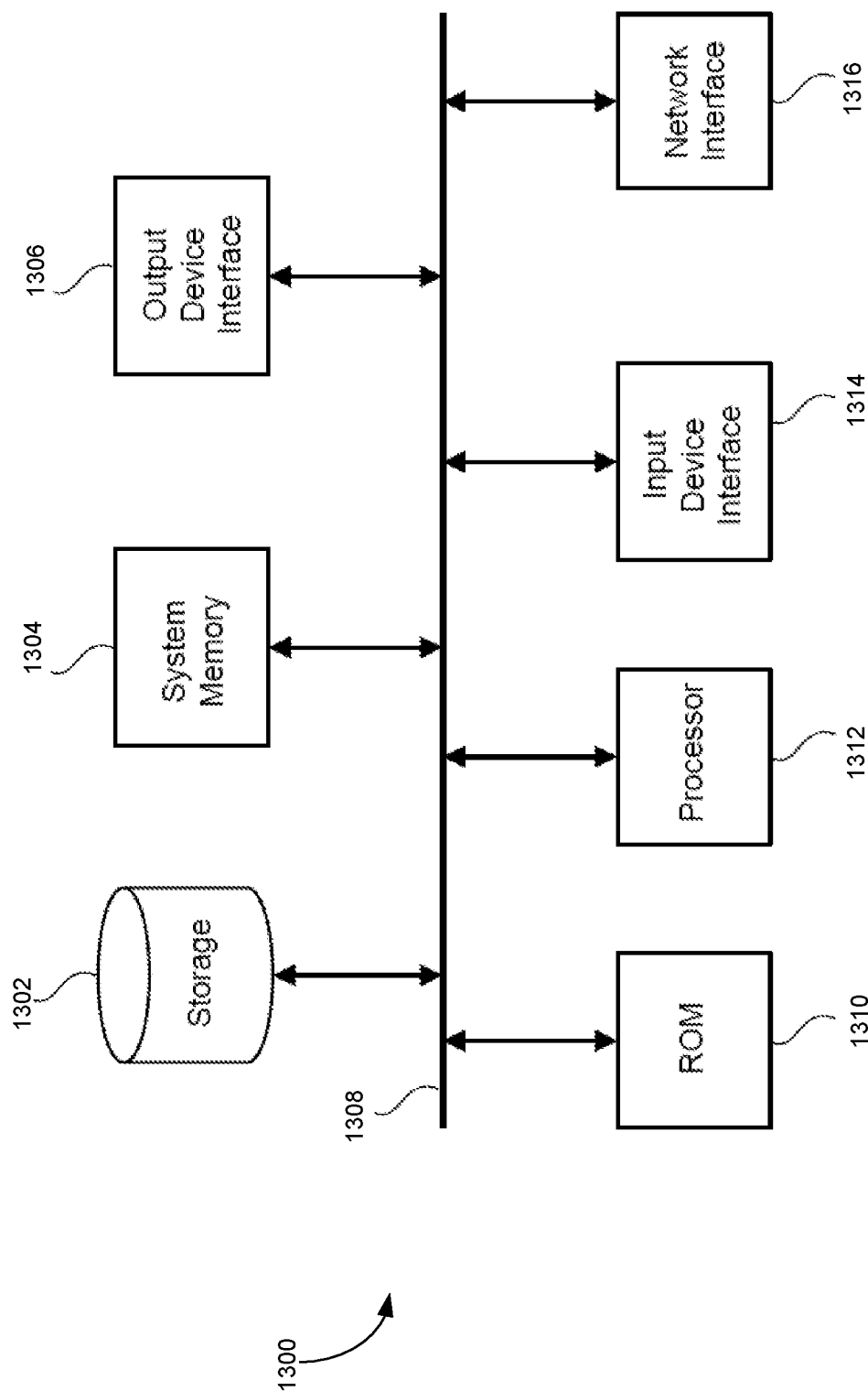
FIG. 13 conceptually illustrates an exemplary electronic system with which some embodiments of the subject technology are implemented.

FIG. 13 conceptually illustrates an exemplary electronic system with which some embodiments of the subject technology are implemented. Electronic system 1300 can be a client, a server, a computer, a smartphone, a PDA, a laptop, or a tablet computer with one or more processors embedded therein or coupled thereto, or any other sort of electronic device. Such an electronic system includes various types of computer-readable media and interfaces for various other types of computer-readable media. Electronic system 1300 includes a bus 1308, processing unit(s) 1312, a system memory 1304, a read-only memory (ROM) 1310, a permanent storage device 1302, an input device interface 1314, an output device interface 1306, and a network interface 1316.

Bus 1308 collectively represents all system, peripheral, and chipset buses that communicatively connect the numerous internal devices of electronic system 1300. For instance, bus 1308 communicatively connects processing unit(s) 1312 with ROM 1310, system memory 1304, and permanent storage device 1302.

From these various memory units, processing unit(s) 1312 retrieves instructions to execute and data to process in order to execute the processes of the subject disclosure. The processing unit(s) can be a single processor or a multi-core processor in different implementations.

ROM 1310 stores static data and instructions that are needed by processing unit(s) 1312 and other modules of the electronic system. Permanent storage device 1302, on the other hand, is a read-and-write memory device. This device is a non-volatile memory unit that stores instructions and data even when electronic system 1300 is off. Some implementations of the subject disclosure use a mass-storage device (such as a magnetic or optical disk and its corresponding disk drive) as permanent storage device 1302.

Other implementations use a removable storage device (such as a floppy disk, flash drive, and its corresponding disk drive) as permanent storage device 1302. Like permanent storage device 1302, system memory 1304 is a read-and-write memory device. However, unlike storage device 1302, system memory 1304 is a volatile read-and-write memory, such as a random access memory. System memory 1304 stores some of the instructions and data that the processor needs at runtime. In some implementations, the processes of the subject disclosure are stored in system memory 1304, permanent storage device 1302, and/or ROM 1310. From these various memory units, processing unit(s) 1312 retrieves instructions to execute and data to process in order to execute the processes of some implementations.

Bus 1308 also connects to input and output device interfaces 1314 and 1306. Input device interface 1314 enables the user to communicate information and send commands to the electronic system. Input devices used with input device interface 1314 include, for example, alphanumeric keyboards and pointing devices (also called "cursor control devices"). Output device interface 1306 enables, for example, the display of images generated by the electronic system 1300. Output devices used with output device interface 1306 include, for example, printers and display devices, such as cathode ray tubes (CRT) or liquid crystal displays (LCD). Some implementations include devices such as a touchscreen that function as both input and output devices.

Finally, as shown in FIG. 13, bus 1308 also couples electronic system 1300 to a network (not shown) through a network interface 1316. In this manner, the computer can be a part of a network of computers (such as a local area network ("LAN"), a wide area network ("WAN"), or an intranet, or a network of networks, such as the Internet. Any or all components of electronic system 1300 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating secure point-to-point communication, the method comprising:
    establishing, by a local client device, a voice communication channel to a remote client device;
    obtaining an encryption key negotiated between the local client device and the remote client device;
    displaying, by the local client device, information derived from the encryption key to a user of the local client device;
    obtaining a voice signal generated by the user of the local client device based on the displayed information derived from the encryption key;

performing a key-validation operation by sending the voice signal from the local client device to the remote client device using the voice communication channel; and in response to a successful validation of the encryption key, establishing a secure point-to-point communication channel between the local client device and the remote client device using the validated encryption key.

2. The computer-implemented method of claim 1, wherein obtaining the encryption key comprises performing a Diffie-Hellman key exchange operation.

3. The computer-implemented method of claim 1, wherein the displayed information derived from the encryption key comprises a fingerprint of the encryption key.

4. The computer-implemented method of claim 3, wherein the fingerprint of the encryption key comprises a number of natural language words or phrases, and wherein the voice signal comprises the user's recitation of the natural language words or phrases.

5. The computer-implemented method of claim 1, further comprising:

receiving a second voice signal from the remote client device, wherein the second voice signal is generated by a second user of the remote client device based on the voice signal and a second encryption key obtained by the remote client device; and determining whether the encryption key is successfully validated based on at least the received second voice signal.

6. The computer-implemented method of claim 5, wherein the second voice signal comprises information associated with a fingerprint of the second encryption key, and wherein the fingerprint of the second encryption key comprises a number of natural language words or phrases.

7. The computer-implemented method of claim 6, wherein the second voice signal comprises the second user's recitation of the natural language words or phrases.

8. A computer system for facilitating secure point-to-point communication, the system comprising:

a processor; and a storage device storing instructions that when executed by the processor cause the processor to perform a method, the method comprising:

establishing, by a local client device, a voice communication channel to a remote client device;

obtaining an encryption key negotiated between the local client device and the remote client device;

displaying, by the local client device, information derived from the encryption key to a user of the local client device;

obtaining a voice signal generated by the user of the local client device based on the displayed information derived from the encryption key;

performing a key-validation operation by sending the voice signal from the local client device to the remote client device using the voice communication channel; and in response to a successful validation of the encryption key, establishing a secure point-to-point communication channel between the local client device and the remote client device using the validated encryption key.

9. The computer system of claim 8, wherein obtaining the encryption key comprises performing a Diffie-Hellman key exchange operation.

10. The computer system of claim 8, wherein the displayed information derived from the encryption key comprises a fingerprint of the encryption key at the local client device.

11. The computer system of claim 10, wherein the fingerprint of the encryption key comprises a number of natural language words or phrases, and wherein the voice signal comprises the user's recitation of the natural language words or phrases.

12. The computer system of claim 8, wherein the method further comprises:

receiving a second voice signal from the remote client device, wherein the second voice signal is generated by a second user of the remote client device based on the voice signal and a second encryption key obtained by the remote client device; and determining whether the encryption key is successfully validated based on at least the received second voice signal.

13. The computer system of claim 12, wherein the second voice signal comprises information associated with a fingerprint of the second encryption key, and wherein the fingerprint of the second encryption key comprises a number of natural language words or phrases.

14. The computer system of claim 13, wherein the second voice signal comprises the second user's recitation of the natural language words or phrases.

15. A non-transitory computer-readable storage medium storing instructions that when executed by a computer cause the computer to perform a method for facilitating secure point-to-point communication, the method comprising:

establishing, by a local client device, a voice communication channel to a remote client device;

obtaining an encryption key negotiated between the local client device and the remote client device;

displaying, by the local client device, information derived from the encryption key to a user of the local client device;

obtaining a voice signal generated by the user of the local client device based on the displayed information derived from the encryption key;

performing a key-validation operation by sending the voice signal from the local client device to the remote client device using the voice communication channel; and in response to a successful validation of the encryption key, establishing a secure point-to-point communication channel between the local client device and the remote client device using the validated encryption key.

16. The computer-readable storage medium of claim 15, wherein obtaining the encryption key comprises performing a Diffie-Hellman key exchange operation.

17. The computer-readable storage medium of claim 15, wherein the displayed information derived from the encryption key comprises a fingerprint of the encryption key at the local client device.

18. The computer-readable storage medium of claim 17, wherein the fingerprint of the encryption key comprises a number of natural language words or phrases, and wherein the voice signal comprises the user's recitation of the natural language words or phrases.

19. The computer-readable storage medium of claim 15, wherein the method further comprises:

receiving a second voice signal from the remote client device, wherein the second voice signal is generated by a second user of the remote client device based on the voice signal and a second encryption key obtained by the remote client device; and determining whether the encryption key is successfully validated based on at least the received second voice signal.

20. The computer-readable storage medium of claim 19, wherein the second voice signal comprises information associated with a fingerprint of the second encryption key, and wherein the fingerprint of the second encryption key comprises a number of natural language words or phrases.

* * * * *